3,114,780
METHOD OF PRODUCING BENZENE AND ETHYLENE FROM ALLYL CHLORIDE
Lawrence J. Hughes, Hitchcock, Tex., assignor to Monsanto Chemical Company, St. Louis, Mo., a corporation of Delaware
No Drawing. Filed Aug. 10, 1960, Ser. No. 48,558
4 Claims. (Cl. 260—668)

The present invention relates to a process for preparing unsaturated organic compounds. More particularly, it relates to the production of ethylene and benzene simultaneously and in good yields from allyl chloride.

Both benzene and ethylene are compounds greatly in demand in the chemical industry. They are particularly useful for reaction together in the presence of a Friedel-Crafts catalyst to produce an alkylate from which ethylbenzene can be separated and in turn dehydrogenated to yield styrene, a monomer of extensive utility in the ever-expanding plastics field. Various methods have been used for producing benzene and ethylene in the past but none has provided for their simultaneous production in a mixture having the proportions suitable for subsequent alkylation of the one with the other. It is the primary object of the present invention to provide such a mixture. Other objects and advantages of the invention will become apparent from the following description thereof.

In its specific embodiment, the invention provides a new and efficient method for simultaneously preparing benzene and ethylene which comprises pyrolyzing allyl chloride at a temperature within the range from about 720° C. to about 765° C.

The following example illustrates the invention but is not to be construed as limiting it in any manner whatsoever.

*Example*

The reactor employed was a 22 mm. I.D. quartz tube 23 inches long fitted with a 6 mm. O.D. thermowell and filled with 4–6 mesh porous silicon carbide. It was wrapped with Nichrome ribbon and covered with high-temperature pipe insulation.

The reactor was heated to a temperature of about 720° C. while a stream of dry nitrogen was passed through it. When the temperature had become stabilized, the allyl chloride feed mixture was passed through the tube. This feed had been prepared by passing nitrogen through a rotameter into an allyl chloride reservoir which was immersed in a constant temperature bath set at 27° C. The nitrogen was saturated with allyl chloride vapor by passing the gas through a sintered glass tip below the liquid surface. The gas mixture containing 400 mm. partial pressure of allyl chloride was then passed through a short preheater maintained at 150° C. before its introduction into the pyrolysis tube. Temperature during the reaction period of about 2 hr. was controlled within the range from about 720° C. to about 765° C., and the feed rate was regulated so that the reaction time was approximately 3.1 seconds.

The effluent gas was conducted through a cold water condenser, a water scrubber, a Dry-Ice trap and a liquid nitrogen trap. The contents of the condenser receiver were combined with the organic phase from the water scrubber and this fraction together with the fractions collected from the Dry Ice trap and the liquid nitrogen trap were analyzed by both gas chromatographic and infrared means. The aqueous solution from the water scrubber was diluted to a standard volume and an aliquot thereof was titrated for HCl content. Based on these analyses, the conversion of allyl chloride was calculated to be 99.5% and the yield of ethylene obtained was 38.4% while that of benzene was 58% based on the allyl chloride converted.

Variations in procedure and reaction conditions from those given in the example may be made without departing from the scope of the invention. For example, the pyrolysis can be carried out in a tubular reactor of porcelain, silica or any other refractory non-catalytic material capable of withstanding the temperatures employed as well as in the quartz reactor exemplified. Likewise, any type of inert finely divided material of high surface area can be used as packing in the reactor. Other materials in addition to the silicon carbide mentioned include quartz or porcelain chips, ground glass, and the like.

Reaction temperature is critical since only a relatively narrow range of temperature will yield the two desired products. At temperatures below 600° C., benzene is produced by the pyrolysis of allyl chloride but not in any significant quantities. At a temperature of about 630° C., benzene and propylene become the major products of pyrolysis but if the temperature is increased to 700° C. or above, the major products are then benzene and ethylene. In order to obtain the optimum yields of benzene and ethylene, therefore, the temperature must be maintained at at least 700° C. and preferably within the range from 720° C. to 765° C. Temperatures above 765° C. can be used but at temperatures above this upper limit, carbonization begins to occur.

Reaction time, i.e., the time during which the allyl chloride is maintained in the pyrolysis zone at reaction temperature, can be varied from about 1 to about 7 seconds with lower yields and conversions being obtained at lower reaction times. Preferably, reaction times of 2.5 to 3.5 seconds are employed.

The nitrogen used in the examples as an inert diluent in the feed is not required having been used merely for convenience as a carrier for the vaporized allyl chloride. No apparent advantages result from the use of an inert diluent and the allyl chloride can be fed as a vapor directly into the reactor.

The pressure employed is preferably atmospheric but operation at either superatmospheric or subatmospheric pressures is feasible.

Recovery of the benzene and ethylene is readily effected by conventional techniques such as low temperature condensation of the product gas mixture followed by fractional distillation of the liquid condensate. Unreacted allyl chloride is also easily recovered by conventional means for recycling in the process.

What is claimed is:
1. A process for the production of benzene and ethylene which comprises subjecting allyl chloride to thermal cracking at a temperature within the range from about 720° C. to about 765° C.
2. A process for the production of benzene and ethylene which comprises passing allyl chloride through a pyrolysis zone packed with an inert finely divided material of high surface area and heated to a temperature within the range from about 720° C. to about 765° C.

3. A process for the production of benzene and ethylene which comprises passing allyl chloride through a pyrolysis zone packed with an inert finely divided material of high surface area and heated to a temperature within the range from about 720° C. to about 765° C. at a rate such that said allyl chloride is maintained at said temperature for from about 1 to about 7 seconds.

4. A process for the production of benzene and ethylene which comprises passing allyl chloride through a pyrolysis zone packed with finely divided silicon carbide and heated to a temperature within the range from about 720° C. to about 765° C. at a rate such that said allyl chloride is maintained at said temperature for from about 2.5 to about 3.5 seconds.

References Cited in the file of this patent
UNITED STATES PATENTS
2,904,695   Schafer _____ Sept. 15, 1959

OTHER REFERENCES

Ephraim: Inorganic Chemistry, fifth edition, Interscience Publisher, Inc., New York 1959 (page 866 relied upon).